(12) United States Patent
Kammerlander et al.

(10) Patent No.: US 7,206,545 B1
(45) Date of Patent: Apr. 17, 2007

(54) METHOD FOR CHANGING RADIO CHANNELS IN A RADIO COMMUNICATION SYSTEM

(75) Inventors: Karl Kammerlander, München (DE); Erich Kamperschroer, Hamminkeln (DE); Egon Schulz, München (DE); Josef Albersmann, Verden (DE); Edgar Bolinth, Mönchengladbach (DE); Uwe Schwark, Bocholt (DE); Werner Troks, Ladbergen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/762,739

(22) PCT Filed: Aug. 12, 1999

(86) PCT No.: PCT/DE99/02518

§ 371 (c)(1),
(2), (4) Date: Jun. 19, 2001

(87) PCT Pub. No.: WO00/10261

PCT Pub. Date: Feb. 24, 2000

(30) Foreign Application Priority Data

Aug. 12, 1998 (DE) .............................. 198 36 576

(51) Int. Cl.
*H04B 1/00* (2006.01)
*H04B 15/00* (2006.01)

(52) U.S. Cl. .................... 455/63.1; 455/436; 455/437; 455/438; 455/450; 455/451; 455/452.1; 455/1; 370/225; 370/330; 370/337; 370/442

(58) Field of Classification Search ................ 455/422, 455/436, 437, 438, 450, 451, 452.1, 452.2, 455/1, 63.1; 370/225, 330, 337, 442
See application file for complete search history.

(56) References Cited

U.S. PATENT DOCUMENTS

| 5,260,944 | A | * | 11/1993 | Tomabechi | .................. 370/347 |
| 5,708,975 | A | * | 1/1998 | Heiskari et al. | ............ 455/63.1 |
| 6,016,311 | A | * | 1/2000 | Gilbert et al. | ............... 370/280 |
| 6,018,528 | A | * | 1/2000 | Gitlin et al. | ................ 370/436 |

FOREIGN PATENT DOCUMENTS

| EP | 0 399 612 | | 11/1990 |
| EP | 0 490 509 A2 | | 6/1992 |
| EP | 0 895 437 A2 | | 2/1999 |
| GB | 0399612 | * | 5/1990 |
| JP | 0895437 | * | 7/1998 |
| WO | WO 98/59441 | | 12/1998 |
| WO | WO9859441 | * | 12/1998 |
| WO | WO 99/17468 | | 4/1999 |
| WO | WO9917468 | * | 8/1999 |

* cited by examiner

*Primary Examiner*—Steve M. D'Agosta
(74) *Attorney, Agent, or Firm*—Bell, Boyd & Lloyd LLP

(57) ABSTRACT

A method for changing only one radio channel of an existing duplex radio link is wherein the radio channel changed or to be changed is the disturbed radio channel. The new radio channel ($D_n$) exhibits, for example in comparison with the disturbed radio channel, only a different timeslot wherein, the radio frequency remains the same.

10 Claims, 1 Drawing Sheet

METHOD FOR CHANGING RADIO CHANNELS IN A RADIO COMMUNICATION SYSTEM

BACKGROUND OF THE INVENTION

1. Field of the Invention

The present invention relates to a method for changing radio channels in a radio communication system, particularly in a mobile radio system, in which an existing duplex radio link exhibits both a first radio channel for transmitting communication information via an air interface and a second radio channel for transmitting communication information in the opposite direction to the first radio channel via the air interface.

2. Description of the Prior Art

It is known to use physical channels in radio communication systems for transmitting communication information. By using these physical channels, the communication information, especially speech data or computer data, is transmitted from a first radio station to a second radio station via an air interface. In the case of duplex radio links, communication information is also transmitted in the opposite direction via the same air interface; i.e. in the direction from the second radio station to the first radio station.

Parameters of the physical channels are, for example, a certain timeslot in a TDMA (Time Division Multiple Access) radio communication system, a certain carrier frequency which is used in the transmission of the communication information in an FDMA (Frequency Division Multiple Access) radio communication system, and a certain code via which the communication information is coded for the radio transmission in a CDMA (Code Division Multiple Access) radio communication system. Combinations of the known multiple access methods TDMA, FDMA and CDMA are possible. In a combined TDMA/FDMA radio communication system, for example, a physical radio channel is defined by its timeslot and either its radio frequency or carrier frequency, respectively.

In known mobile radio systems, especially in the GSM (Global System for Mobile Telecommunication), the radio channels via which communication information can be transmitted between a certain base station and a certain mobile station are issued centrally by a coordination unit. The coordination unit selects the individual controls of the base stations operated in the GSM and assigns to them the radio channels.

However, radio communication systems are also known which operate in a so-called uncoordinated mode. In such systems, the radio channels are not issued centrally for the entire system but, instead, the radio stations involved in a radio link select their own radio channels from an existing pool of available radio channels. An example of a radio station operating in uncoordinated mode is the mobile station of a mobile radio system according to the DECT standard.

As already mentioned above, duplex radio links are set up for transmitting bidirectional data, voice information or communication information of other services via an air interface in known radio communication systems, especially in a GSM, a system according to the DECT standard or in a future UMTS (Universal Mobile Telecommunication System). In particular, the TDD (Time Division Duplex) method is known in which a first radio channel and a second radio channel of the same duplex radio link use different timeslots of the same carrier frequency. In this arrangement, the first radio channel represents the radio link in one direction and the second radio channel represents the radio link in the opposite direction. Furthermore, the FDD (Frequency Division Duplex) method is known in which the first radio channel of the duplex radio link uses a first radio frequency and the second radio channel of the duplex radio link uses a second, different radio frequency.

In the duplex radio links of known radio communication systems, there is a fixed association between each pair of the available physical radio channels. In a DECT mobile radio system, for example, in each case 24 timeslots of 10 carrier frequencies are available for the physical radio channels. In this arrangement, the first 12 timeslots of the carrier frequencies are in each case reserved for the downlink radio link between a base station and a mobile station. Timeslots 13 to 24 of the carrier frequencies are reserved for the uplink radio links in the opposite direction from the mobile station to the base station. However, the fixed association in the case of each pair of radio channels does not allow arbitrary combinations of a downlink radio channel and an uplink radio channel in a duplex radio link but decides that each downlink radio channel is permanently associated with a certain uplink radio channel. In the case of the DECT system, the two associated radio channels in each case use the same carrier frequency, the downlink radio channel and the uplink radio channel also using the timeslot which has the same ordinal number in the available 12 timeslots which are allocated to the downlink radio channels and the uplink radio channels. For example, the first timeslot of a carrier frequency is thus permanently joined to timeslot 13, the second timeslot is permanently joined to timeslot 14, and so on.

In GSM, too, there is a fixed association between the uplink radio channel and the downlink radio channel of a duplex radio link. In distinction from the DECT systems, the associated radio channels use different radio frequencies. However, a pair of associated radio channels is in each case allocated to the timeslot having the same ordinal number in the two radio frequencies used. Thus, for example, in each case timeslot 1 of two radio frequencies or timeslot 2 of two radio frequencies and so on is used by a duplex radio link.

During the operation of existing duplex radio links, disturbances which can lead to a loss of the communication information transmitted can occur, for example, due to interference, multi-path propagation and/or fading of communication signals. To prevent further disturbances or to eliminate the disturbance of the duplex radio link, it is typical to change the physical radio channels of the duplex radio link involving both the radio channel for one direction of transmission and the radio channel for the opposite direction.

This situation is explained in greater detail in FIG. 1 of the attached drawing. FIG. 1 shows a total of eight physical radio channels which exist in a radio communication system with TDMA multiple access components. The individual physical radio channels are defined by the common carrier frequency f and by in each case one of the eight timeslots t1, t2 ... t8. Before a disturbance occurs, an existing duplex radio link uses radio channel $D_a$ with the frequency/timeslot combination f/t1 in the downlink direction and radio channel $U_a$ with the frequency/timeslot combination f/t5 in the uplink direction. Then a disturbance occurs, for example in the downlink radio channel $D_a$ which is subjected by the mobile station due to an unacceptably high bit error rate. The base station then determines a new available downlink radio channel by accessing a list of the available radio channels which carries an entry for each radio channel whether the radio channel is also disturbed or otherwise used.

In this manner, the mobile station determines the radio channel having the frequency/timeslot combination f/t3 as a possible new downlink radio channel $D_n$ and informs the base station that a change to this radio channel will be initiated and, respectively, that the base station should transmit on radio channel $D_n$ after the change. According to defined protocols, both the change of the downlink radio channel from radio channel $D_a$ to radio channel $D_n$ and the change of the uplink radio channel from radio channel $U_a$ to radio channel $U_n$ is then performed. The vertical line between the radio channels having timeslots t1 to t4 and between the radio channels having timeslots t5 to t8 indicates that the radio communication system under consideration is a system in which the first four radio channels of the carrier frequency f are exclusively used for downlink connections and the second four radio channels are exclusively used for uplink radio links.

From EP 0 399 612 A2, a method and a system for data transmission via a TDD channel is known in which at least one bidirectional (duplex) voice channel formed of two non-adjacent timeslots is provided for a data transmission between a first radio transceiver station and a second radio transceiver station. In this arrangement, when two or more duplex voice channels are used—if more data packets are to be transmitted in one direction of transmission than in the opposite direction, timeslots of the duplex voice channels allocated to the opposite direction and unused are released and made available for the transmission of the data packets in the direction of transmission.

The present invention is, therefore directed to a method for changing a radio channel of the type initially mentioned, in which the frequency spectrum of the available radio channels can be utilized as well as possible and in which the change can be performed in the shortest possible time.

SUMMARY OF THE INVENTION

Accordingly, a central idea of the present invention is that only the disturbed first or disturbed second radio channel is changed in the case of a disturbance of the existing duplex radio link. This central idea is based on the finding that in many cases, only one of the currently used radio channels is disturbed in the case of a disturbance of the duplex radio link. To eliminate the disturbance as quickly as possible, only the disturbed radio channel is, therefore, changed. As a rule, changing only one radio channel is associated with a much smaller exchange of signaling information via the air interface than when a number of radio channels are changed.

The disturbed duplex radio link can be, in particular, a radio link which uses not only in each case one radio channel for the two transmission directions but, for example, a number of radio channels for transmitting computer data in the downlink direction. Furthermore, the number of radio channels used in one direction can differ from the number of the radio channels used in the opposite direction.

The method according to the present invention is advantageously used in a number of different multiple access methods or combinations of these multiple access methods.

In and embodiment, the radio communication system exhibits a TDMA multiple access component and only the timeslot of the disturbed first radio channel or of the disturbed second radio channel is changed.

In another embodiment, the radio communication system exhibits an FDMA multiple access component and only the carrier frequency of the disturbed first radio channel or of the disturbed second radio channel is changed.

The method according to the present invention can be used particularly advantageously if the radio communication system exhibits both a TDMA and an FDMA multiple access component and if both the carrier frequency and the timeslot of the disturbed first radio channel or of the disturbed second radio channel can be changed. This provides a multiplicity of existing radio channels of the radio communication system for the selection of a new radio channel when the disturbed radio channel is changed.

The available radio channels are used more effectively than in known radio communication systems with a fixed association of duplex radio channels even if the radio communication system only offers radio channels either as first radio channel for one direction of transmission or as second radio channel for the opposite direction.

However, it is proposed not to perform such a separation between first and second radio channels but to form only a single pool of available physical radio channels from which, if necessary, a radio channel can be taken which is then used either as first radio channel or as second radio channel.

As can be seen immediately, the spectral efficiency, or the efficiency in using the available frequency spectrum, is much greater in this case than in known methods which, due to the association between the duplex radio channels, only allow a simultaneous change of both channels so that a radio channel which may be undisturbed also has to be changed and cannot be used any longer.

In a further development of the present invention, the radio communication system exhibits a CDMA multiple access component and the transmission code of the disturbed first radio channel or of the disturbed second radio channel is changed.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
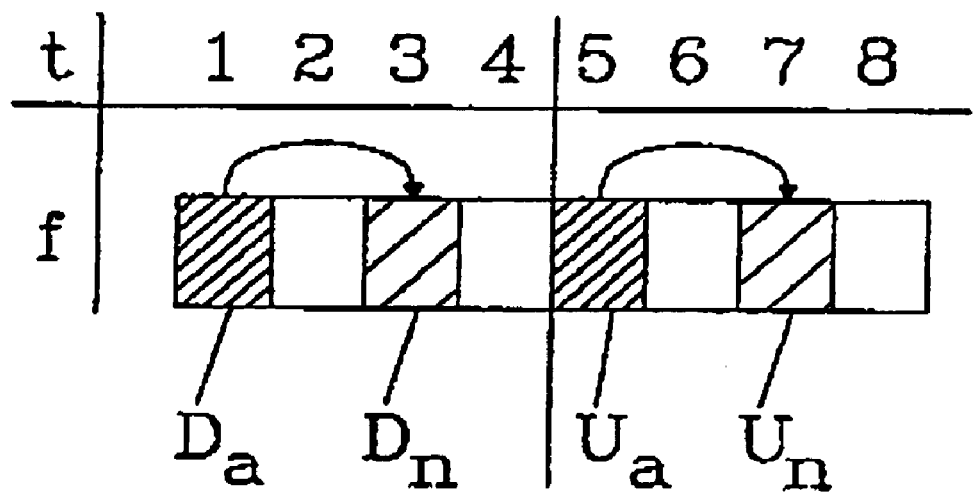
FIG. 1 shows a change of radio channels in accordance with a known method as explained herein.
Figure 2:
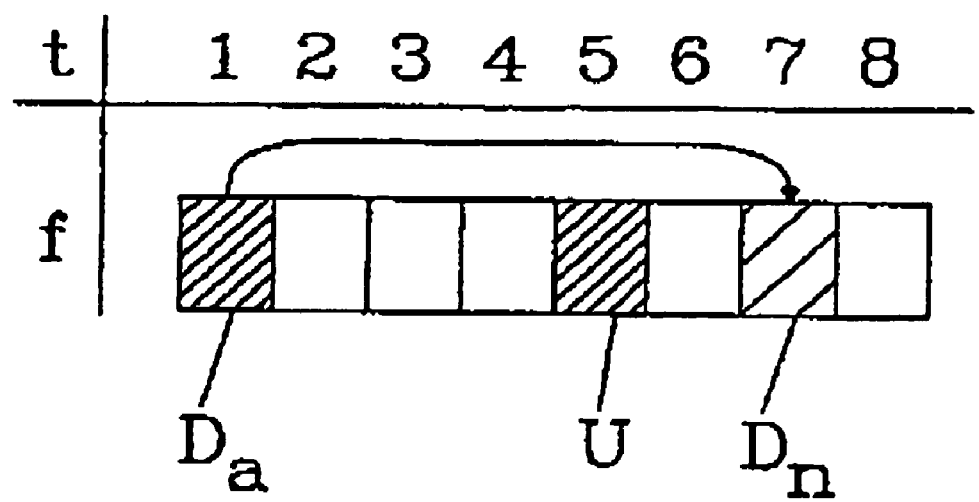
FIG. 2 shows an exemplary embodiment of the method according to the present invention.

Similar to what has already been explained with reference to FIG. 1, FIG. 2 shows a radio communication system with a TDMA multiple access component. It shows eight timeslots t1, t2 . . . t8 of a carrier frequency f or, respectfully, the physical radio channels defined in this way. In distinction from the radio communication system described via FIG. 1, however, there is no fixed association between the radio channels which can be used in one and the same duplex radio link. Instead, all available physical radio channels of the system form a common pool of radio channels from which, if necessary, a radio channel can be taken and used in a radio link.

Thus, for example, it is also possible to take from the pool not only radio channels for duplex radio links but also for unidirectional links; for example for transmitting signaling information from a base station to a multiplicity of mobile stations. The term "unidirectional" is not intended to mean that the information is only to be transmitted in one spatial direction but, if one or more air interfaces are taken into consideration, only in each case one of the two directions of transmission of the respective air interface.

In the case shown in FIG. 2, there is initially a duplex radio link of a mobile radio system, the downlink connection being established via the radio channel $D_a$ and the uplink radio link being established via the radio channel U. A disturbance of the radio channel $D_a$ then occurs, for example due to multipath propagation. The mobile station detects the disturbance and selects the new downlink radio channel $D_n$ from the pool of available radio channels. It informs the base station of the intended change and the base station adjusts the transmission of communication information to the corresponding new timeslot t7 in the course of the changing procedure then initiated.

As already emphasized, the present invention is not restricted to the exemplary embodiment explained with reference to FIG. 2. Instead, the method according to the present invention is advantageously used especially in the case of a possibility of a change of both the radio frequency and of the timeslot of the disturbed radio channel. In general, the advantages of the method according to the invention present can be enumerated as follows which, however, does not conclude the enumeration:

If it is not both the first radio channel and the second radio channel of an existing duplex radio link which are disturbed, it is not necessary to change the first and the second radio channel. The undisturbed radio channel or the undisturbed radio channels, respectively, are, therefore, still used so that the available frequency spectrum is used more efficiently compared with the known methods.

Each change of a radio channel can create interference on other radio links in that the electromagnetic waves radiated on the new radio channel have a disturbing effect on other radio links which may be quite a distance in space. Thus, the lower rate of channel changes in the method according to the present invention also reduces the probability of disturbing other radio links more than proportionally since a disturbance produced by a change of channels, and the further change of channels triggered by this, in turn, entails further disturbance of a radio link with a certain probability.

Changing only one radio channel requires less time expenditure in the search for a new undisturbed radio channel and in transmitting and evaluating signaling information which is transmitted between radio stations involved.

Because of the reduced amount of work having to be expended in the radio stations involved, the hardware and software resources of the radio stations also can be correspondingly reduced in size.

The method according to the present invention can be used, in particular, for the so-called uncoordinated operation in a future mobile radio system; for example the UMTS (Universal Mobile Telecommunication System) in TDD (Time Division Duplex) mode. However, the present invention also can be advantageously used in other systems, for example in systems which are operated in accordance with the DECT standard, in relinquishing the fixed association of a pair of physical radio channels in each case and only changing the disturbed first radio channel or the disturbed second radio channel in the case of a disturbed duplex radio link.

Although the present invention has been described with reference to specific embodiments, those of skill in the art will recognize that changes may be made thereto without departing from the spirit and scope of the invention as set forth in the hereafter appended claims.

The invention claimed is:

1. A method for changing radio channels in a mobile radio communication system having a TDMA (Time Division Multiple Access) component, the method comprising the steps of:
    providing an existing duplex radio link having both a first physical radio channel for transmitting communication information via an air interface, and a second physical radio channel for transmitting communication information in an opposite direction to the first physical radio channel via the air interface, wherein each available radio channel of the mobile radio communication system can be used both as a first physical radio channel and as a second; and
    changing, upon a disturbance of the duplex radio link, only one of the disturbed first or second physical radio channels, wherein the undisturbed first or second physical radio channel is retained, wherein a time slot of the disturbed one of the first physical radio channel and the second physical radio channel is changed.

2. A method for changing radio channels in a mobile radio communication system having a FDMA (Frequency Division Multiple Access) component, the method comprising the steps of:
    providing an existing duplex radio link having both a first physical radio channel for transmitting communication information via an air interface, and a second physical radio channel for transmitting communication information in an opposite direction to the first physical radio channel via the air interface, wherein each available radio channel of the mobile radio communication system can be used both as a first physical radio channel and as a second; and
    changing, upon a disturbance of the duplex radio link, only one of the disturbed first or second physical radio channels, wherein the undisturbed first or second physical radio channel is retained, wherein a carrier frequency of the disturbed one of the first physical radio channel and the second physical radio channel is changed.

3. A method for changing radio channels in a mobile radio communication system having a CDMA (Code Division Multiple Access) component, the method comprising the steps of:
    providing an existing duplex radio link having both a first physical radio channel for transmitting communication information via an air interface, and a second physical radio channel for transmitting communication information in an opposite direction to the first physical radio channel via the air interface, wherein each available radio channel of the mobile radio communication system can be used both as a first physical radio channel and as a second; and
    changing, upon a disturbance of the duplex radio link, only one of the disturbed first or second physical radio channels, wherein the undisturbed first or second physical radio channel is retained, wherein a transmission code of the disturbed one of the first physical radio channel and the second physical radio channel is changed.

4. A method for changing radio channels in a mobile radio communication system having both a TDMA multiple access component and an FDMA multiple access component, the method comprising the steps of:

providing an existing duplex radio link having both a first physical radio channel for transmitting communication information via an air interface, and a second physical radio channel for transmitting communication information in an opposite direction to the first physical radio channel via the air interface, wherein each available radio channel of the mobile radio communication system can be used both as a first physical radio channel and as a second; and changing, upon a disturbance of the duplex radio link, only one of the disturbed first or second physical radio channels, wherein the undisturbed first or second physical radio channel is retained, wherein both a time slot and a carrier frequency of the disturbed one of the first physical radio channel and the second physical radio channel is changed.

5. A method for managing radio channels in a mobile radio communication system, the method comprising the steps of:

providing an existing duplex radio link having an first physical radio channel and a second physical radio channel that transmits communication information via an air interface, wherein the second radio channel transmits in the opposite direction of the first radio channel;

determining whether a disturbance exists in the first physical radio channel or second physical radio channel;

changing a transmission characteristic in the first physical radio channel in order to select a new first physical radio channel for the duplex radio link if a disturbance is determined in the first physical radio channel, wherein the second physical radio channel is retained when the new first physical radio channel is selected; and changing a transmission characteristic in the second physical radio channel in order to select a new second physical radio channel for the duplex radio link if a disturbance is determined in the second physical radio channel, wherein the first physical radio channel is retained when the new second physical radio channel is selected.

6. A method for managing radio channels in a mobile radio communication system as claimed in claim 5, wherein the mobile radio communication system exhibits a TDMA (Time Division Multiple Access) component wherein the transmission characteristic is a time slot of the physical radio channel that is being replaced by the selected new radio channel.

7. A method for managing radio channels in a mobile radio communication system as claimed in claim 5, wherein the mobile radio communication system exhibits a FDMA (Frequency Division Multiple Access) component wherein the transmission characteristic is a carrier frequency of the physical radio channel that is being replaced by the selected new radio channel.

8. A method for managing radio channels in a mobile radio communication system as claimed in claim 5, wherein the radio communication system exhibits both a TDMA multiple access component and an FDMA multiple access component wherein the transmission characteristic is both a time slot and a carrier frequency of the physical radio channel that is being replaced by the selected new radio channel.

9. A method for managing radio channels in a mobile radio communication system as claimed in claim 5, wherein the radio communication system exhibits a CDMA (Code Division Multiple Access) component in wherein the transmission characteristic is a transmission code of the physical radio channel that is being replaced by the selected new radio channel.

10. A method for managing radio channels in a mobile radio communication system as claimed in claim 5, wherein each available radio channel of the mobile radio communication system can be used both as an first physical radio channel and a second physical radio channel that is being replaced by the selected new radio channel.

* * * * *